United States Patent
Inaba

(10) Patent No.: US 7,127,626 B2
(45) Date of Patent: Oct. 24, 2006

(54) DATA PROCESSING APPARATUS CONFIGURED TO OPERATE WITH ONE OF MORE CLOCK FREQUENCIES DETERMINED BY A PRIORITY ORDER DERIVED FROM ONE OR MORE INTERRUPT SIGNALS FROM A CPU

(75) Inventor: Soichiro Inaba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 419 days.

(21) Appl. No.: 10/623,718

(22) Filed: Jul. 22, 2003

(65) Prior Publication Data

US 2004/0139362 A1 Jul. 15, 2004

(30) Foreign Application Priority Data

Jul. 23, 2002 (JP) .............................. 2002-214031

(51) Int. Cl.
 *G06F 1/26* (2006.01)
(52) U.S. Cl. ...................... 713/322; 713/344; 713/500; 713/310; 710/310
(58) Field of Classification Search ................ 713/500, 713/344, 322, 310; 710/310
 See application file for complete search history.

(56) References Cited

U.S. PATENT DOCUMENTS 5,361,392 A * 11/1994 Fourcroy et al. ........... 713/310
5,826,092 A * 10/1998 Flannery ..................... 713/324
5,832,243 A * 11/1998 Seeman ...................... 710/310
6,073,244 A * 6/2000 Iwazaki ...................... 713/322
2001/0011356 A1* 8/2001 Lee et al. .................... 713/322

FOREIGN PATENT DOCUMENTS

| JP | 61-286913 | 12/1986 |
| JP | 7-287699 | 10/1995 |
| JP | 09-319651 | 12/1997 |
| JP | 2000-311027 | 11/2000 |

\* cited by examiner

*Primary Examiner*—Thomas Lee
*Assistant Examiner*—Sean Weinman
(74) *Attorney, Agent, or Firm*—Rabin & Berdo P.C.

(57) ABSTRACT

A data processing machine including a CPU which is configured to operate with an adjustable (variable) clock frequency. The clock frequency is adjusted in accordance with a clock change request signal. A plurality of clock change request signals have respective priority orders. A plurality of clock frequencies are prepared for the clock change request signals. When two or more clock change request signals are input, one of them is selected based on the priority order. The clock signal (clock frequency) to be applied to the CPU is changed in accordance with the selected clock change request signal. The data processing machine can adjust a timing for memory access to an optimal timing when the clock frequency is adjusted. The data processing machine can also deal with various clock frequency change requests.

10 Claims, 6 Drawing Sheets

DATA PROCESSING APPARATUS CONFIGURED TO OPERATE WITH ONE OF MORE CLOCK FREQUENCIES DETERMINED BY A PRIORITY ORDER DERIVED FROM ONE OR MORE INTERRUPT SIGNALS FROM A CPU

BACKGROUND OF THE INVENTION

1. Field of the Invention

The present invention relates to a data processing apparatus including a CPU (Central Processor Unit).

2. Description of the Related Art

In general, a CPU incorporated in a data processing machine reads and executes commands and instructions from a memory in response to a pulse signal produced periodically (i.e., clock signal). A frequency of the clock signal governs the fundamental operation of the data processing machine so that the clock signal frequency must be maintained appropriately. A crystal oscillator is, for example, used to maintain the clock signal frequency.

In recent years, small, lightweight data processing devices (e.g., cellular phones and PDA (Personal Data Assistant) devices) are used by many people. The small, lightweight data processing device should have a high throughput speed and should not consume battery electricity quickly. Usually, the small, lightweight data processing device is a portable electronic device. If a battery runs out, the portable data processing device does not work. The CPU is an element which consumes electricity most. One approach to reduce the electric power consumption by the CPU is to temporarily decrease the clock frequency for the CPU.

Japanese Patent Application Kokai No. 61-286913 teaches a method of adjusting a clock frequency of an electronic device having a CPU, in accordance with a hardware signal. Japanese Patent Application Kokai No. 61-286913 discloses one embodiment, in which the hardware signal is input in response to connection (or disconnection) of an AC adapter, and the clock frequency of the CPU is varied with the inputting of the hardware signal. In Japanese Patent Application Kokai No. 61-286913, however, the CPU-cannot recognize the change of the clock frequency. Thus, a memory access timing is not adjusted appropriately when the clock frequency is adjusted. This is because a memory access time includes a certain period to finish an address decoding process and other related processes. Before the CPU really becomes ready to retrieve data from a memory, a wait time which is worth of several clocks should be inserted into the memory access time. If the clock frequency dynamically changes, the wait time must be changed correspondingly in order to avoid an access error. In general, the wait time is expressed by the number of clocks needed. For example, one wait time (or wait time number "1") is a waiting period of one clock long.

In order to overcome such drawbacks of Japanese Patent Application Kokai No. 61-286913, Japanese Patent Application Kokai No. 9-319651 proposed an approach applicable to a single-chip microcomputer having a memory. When a clock frequency changes, the wait time to the memory access is also changed by software control. This eliminates the problem of the adjustment of the memory access wait time. However, since the software adjusts the memory access wait time, the software (or the microcomputer) suffers from overhead and consumes a relatively large amount of electricity. Further, the following problem arises due to time discrepancy between when the clock frequency changes and when the memory access wait time changes.

If the clock is fast, a long memory access wait time should be inserted (the faster, the longer). If the clock is slow, a short wait time should be inserted. Therefore, if the memory access wait time is shortened while the clock speed is still high during the process of changing the fast clock (i.e., high frequency clock) to the slow clock (i.e., low frequency clock), the access is missed. In order to avoid this, the memory access wait time should be shortened after the clock speed has dropped. In this case, however, the clock is slow whereas a long wait time is included for a certain period.

Likewise, the low speed clock should be changed to the high speed clock after the wait time is increased to match the high speed clock. This creates a situation in which the clock is slow whereas the long wait time is set during the transition period from the low speed clock to the high speed clock. As a result, the memory access cannot be performed in an originally designed way during the transition period.

In addition, Japanese Patent Application Kokai No. 9-319651 was developed on the assumption that there is only one clock change request. In other words, Japanese Patent Application Kokai No. 9-319651 cannot deal with a case where there are a plurality of clock change requests. Consequently, it is not possible to perform delicate processing in response to various types of clock change requests.

SUMMARY OF THE INVENTION

An object of the present invention is to provide a data processing apparatus which can optimize memory access timing and cope with various clock change requests.

According to one aspect of the present invention, there is provided a data processing apparatus including a CPU configured to operate with one of a plurality of clock frequencies determined in accordance with a selected one of a plurality of clock change signals. A priority order is given to the clock change signals. The data processing apparatus also includes a storage unit for storing plural pieces of CPU operating condition setting information corresponding to the clock change signals, respectively. The plural pieces of CPU operating condition setting information include at least the plural clock frequencies, respectively. The data processing apparatus also includes a selector for selecting one of the clock change signals based on the priority order, and a clock frequency changer for determining the one of the clock frequencies based on one of the plural pieces of CPU operating condition setting information including the selected clock change signal.

The clock change signals may correspond to a plurality of interrupt signals entered to the CPU, respectively.

DETAILED DESCRIPTION OF THE INVENTION

Embodiments of the present invention will be described with reference to the accompanying drawings.

Figure 1:
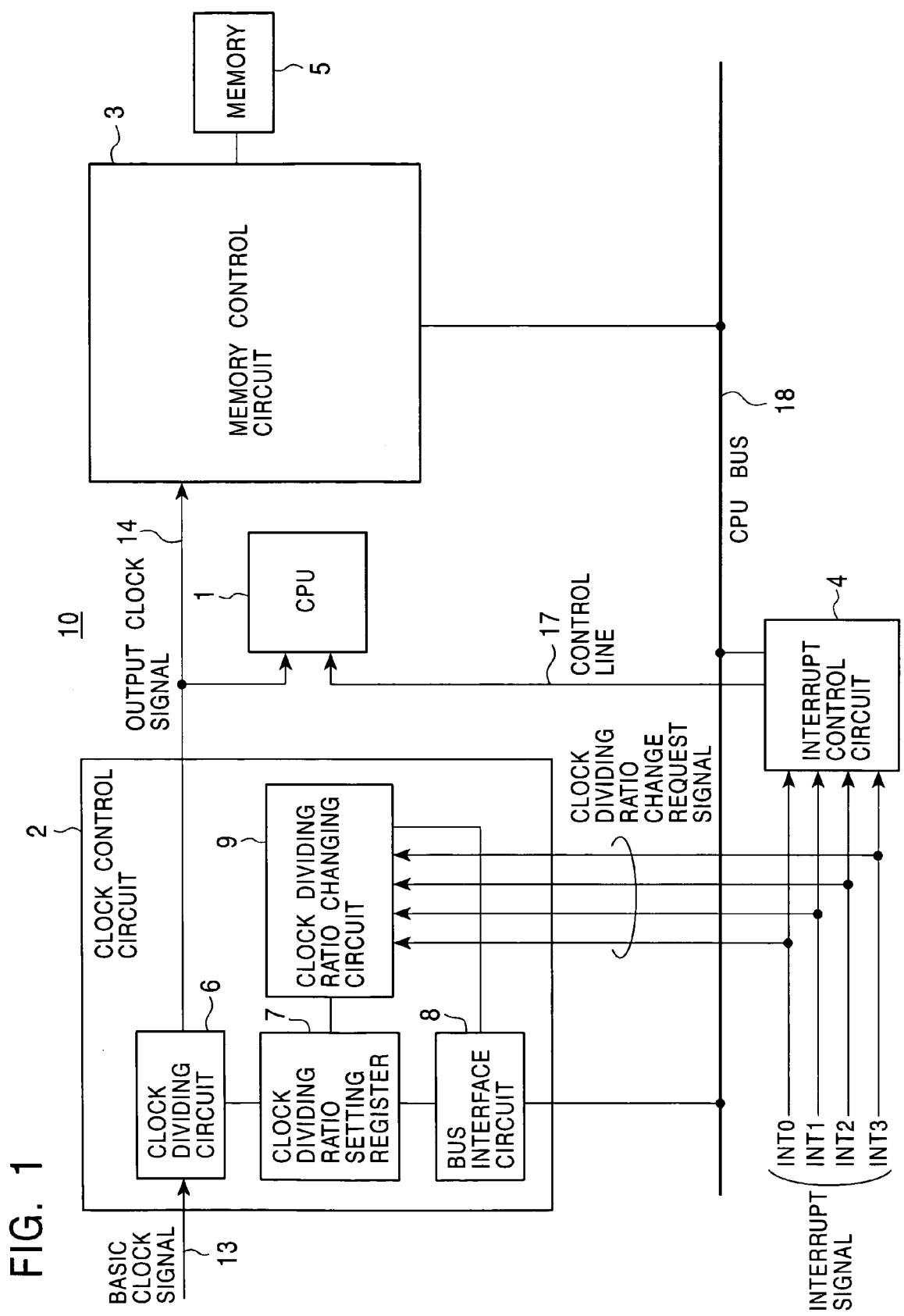
FIG. 1 illustrates a block diagram of a data processing apparatus according to a first embodiment of the present invention.

First Embodiment:

Referring to FIG. 1, a construction of a data processing apparatus 10 according to a first embodiment of the present invention is illustrated.

The data processing apparatus 10 includes a CPU 1, clock control circuit 2, memory control circuit 3, memory 5 and interrupt control circuit 4. These elements are connected to each other by a CPU bus 18. The CPU 1 is a microprocessor to control the peripheral circuits. A control line 17 extends to the CPU 1 from the interrupt control circuit 4, and an output clock signal 14 is input to the CPU 1 from the clock control circuit 2. The clock control circuit 2 divides a basic clock signal 13 supplied from a crystal oscillator (not shown) to produce the output clock signal 14. The output clock signal 14 is a clock to govern the data processing apparatus 10. The clock control circuit 2 includes a clock dividing circuit 6 to divide the clock, a clock division setting register 7 to determine a dividing ratio of the clock in the clock dividing circuit 6, a bus interface circuit 8 to interface between the CPU 11 and the clock division setting register 7, and a clock division changing circuit 9. The clock division changing circuit 9 receives a clock dividing ratio change request signal, which is one of four interrupt signals INT0 to INT3. The clock dividing ratio change request signal is a clock change signal. The clock division changing circuit 9 changes the dividing ratio of the basic clock signal 13 in accordance with the clock change signal asserted, thereby changing a frequency of the output clock signal 14.

The interrupt control circuit 4 accepts one of a plurality of interrupt signals INT0 to INT3, and issues an interrupt control signal to the CPU 1 via the control line 17. The memory control circuit 3 interfaces between the CPU bus 18 and the memory 5, and controls the access to the memory 5 in response to the output clock signal 14 supplied from the clock control circuit 2.

Figure 2:
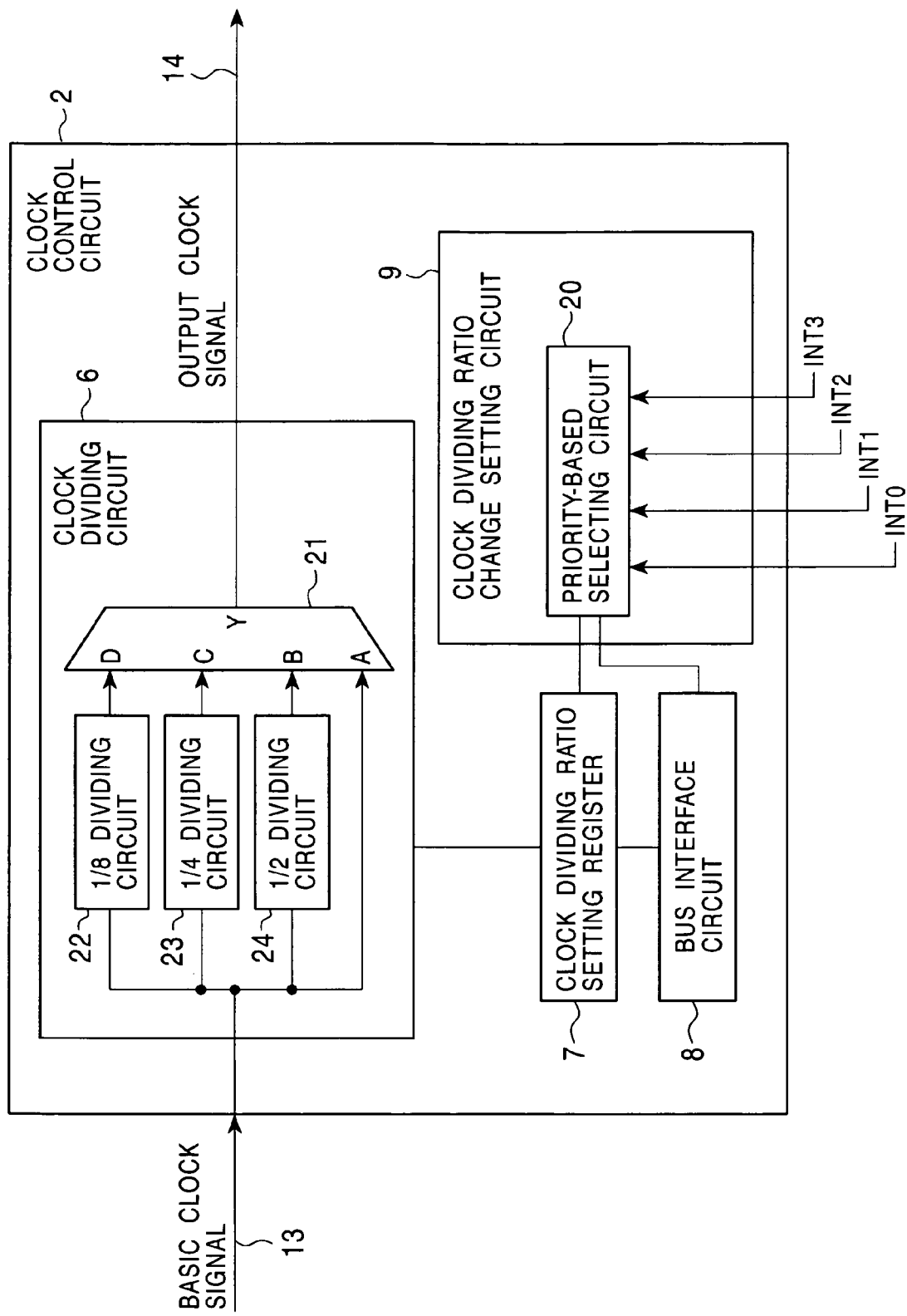
FIG. 2 illustrates a detailed block diagram of a clock control circuit included in the data processing apparatus shown in FIG. 1.

Referring to FIG. 2, a detailed structure of the clock control circuit 2 in the data processing apparatus 10 shown in FIG. 1 is illustrated.

The clock dividing circuit 6 includes three dividing circuits 22, 23 and 24 which have different dividing ratios. The dividing circuit 22 is a 1/8 dividing circuit, the dividing circuit 23 is a 1/4 dividing circuit, and the dividing circuit 24 is a 1/2 dividing circuit. The clock dividing circuit 6 also includes a selector 21. The selector 21 has input terminals B, C and D to receive divided clock signals, which are obtained by dividing the basic clock 13 by the dividing circuits 22, 23 and 24, respectively. The selector 21 also has a terminal A to receive the non-divided clock signal. The selector 21 selects one of the four incoming clock signals, and outputs the selected clock signal 14 from a terminal Y. The selected clock signal 14 is referred to as "output clock signal". The selection is made by the selector 21 based on a value stored in the clock dividing ration setting register 7. For example, if a binary value "00b" is set in the register 7, the input terminal A is selected. As a result, the dividing ratio applied to the basic clock 13 by the clock dividing circuit 6 becomes 1/1. If a binary value "01b" is set in the register 7, the input terminal B is selected. In this case, the dividing ratio applied to the basic clock 13 becomes 1/2. If a binary value "10b" is set in the register 7, the input terminal C is selected, and the dividing ratio applied to the basic clock 13 becomes 1/4. If a binary value "11b" is set in the register 7, the input terminal D is selected, and the dividing ratio applied to the basic clock 13 becomes 1/8.

The clock dividing ratio change circuit 9 includes a priority-based selecting circuit 20 to accept the four interrupt signals INT0 to INT3 via a mask control circuit (not shown). If one of the interrupt signals INT0 to INT3 is asserted to the selecting circuit 20, the selecting circuit 20 selects the asserted interrupt signal. If a plurality of interrupt signals are simultaneously asserted to the selecting circuit 20, the selecting circuit 20 selects one of them, which has the highest priority. The priority orders are assigned to the respective interrupt signals INT0 to INT3 beforehand. The priority order is specified by the software of the CPU 1. For instance, the priority orders are assigned to the interrupt signals as follow: INT0>INT1>INT2>INT3. The selecting circuit 20 issues a signal corresponding to the selected interrupt signal (i.e., interrupt signal having the highest priority) to the clock dividing ratio register 7. As a result, the value in the dividing ratio register 7 is set to "00b", "01b", "10b" or "11b", based on a signal entered to the dividing ratio register 7. In this manner, the clock signal frequency of the CPU 1 can be changed.

Now, a normal operation of the data processing apparatus 10 will be described.

When the data processing apparatus 10 is in a low speed clock mode or in a stand-by mode, the CPU 1 writes a value "11b" into the clock dividing ratio register 7 via the bus interface circuit 8. Then, the clock dividing circuit 6 selects the 1/8 dividing circuit 22 because the dividing ratio "1/8" is specified by the value "11b" in the dividing ratio register 7. If the basic clock signal 13 has a frequency of 1,000 MHz, the output clock signal 14 has a frequency of 125 MHz. Each circuit in the data processing apparatus 10 including the CPU 1 therefore operates at the slowest frequency (i.e., 125 MHz).

It should be assumed here that the interrupt signal INT1, which requires the second highest processing, is asserted during the low speed clock mode or stand-by mode. If the interrupt signal INT0, which has higher priority than the interrupt signal INT1, is not asserted at the same time, then the interrupt signal INT1 is admitted by the selecting circuit 20. Thus, the value "01b" corresponding to the interrupt signal INT1 is sent to the clock dividing ratio register 7 from the selecting circuit 20. The value "01b" is overwritten in the clock dividing ratio register 7. The selector 21 in the clock dividing circuit 6 then selects the 1/2 dividing circuit which corresponds to the value "01b" set in the clock dividing ratio register 7. As a result, the output clock signal 14 is changed to the 1/2 divided clock signal from the 1/8 divided clock signal. If the frequency of the basic clock signal 13 is 1,000 MHz, the frequency of the new output clock signal 14 becomes 500 MHz. Each circuit in the data processing apparatus 10 including the CPU 1 now operates at a moderate frequency (i.e., 500 MHz). In the meantime, the interrupt signal INT1 is also input to the interrupt control circuit 4 so that an interrupt process is triggered.

As understood from the foregoing, the system clock frequency can be varied to a plurality of values in response to a plurality of frequency change request signals. Accordingly, it is possible to select an optimal clock frequency. When a plurality of request signals are asserted, one request signal having the highest priority is selected. Therefore, an optimal clock is selected. In this manner, an optimal power consumption and optimal throughput are determined. Further, since the interruption signal is used as the clock frequency change request signal, the CPU 1 can recognize the change of the clock frequency at the same time the clock frequency change request is made. Thus, the CPU 1 is able to promptly deal with the change of the clock frequency. For instance, the CPU 1 immediately changes the memory access wait time. Because the interrupt signal is used as the clock frequency change request signal, a clock having a frequency that matches the interrupt process is selected.

Figure 3:
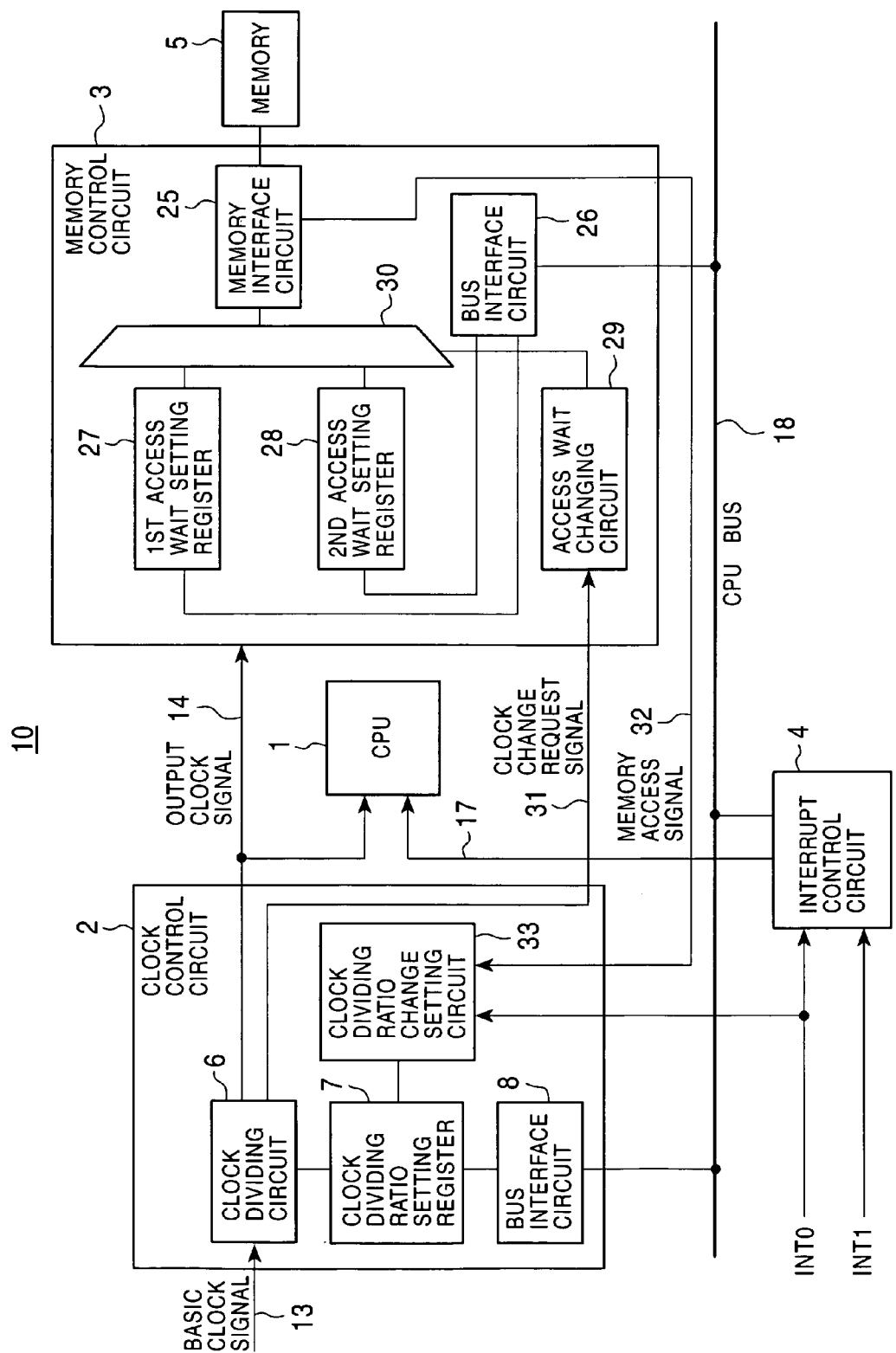
FIG. 3 illustrates a block diagram of a data processing apparatus according to a second embodiment of the present invention.

Second Embodiment:

Referring to FIG. 3, a data processing apparatus 10 according to a second embodiment of the present invention is illustrated. Similar reference numerals are used to designate similar elements in the first and second embodiments.

The data processing apparatus 10 of the second embodiment can change the clock frequency at the same time the wait time of the memory access timing is changed, by the hardware of the data processing apparatus 10. The data processing apparatus of the second embodiment is different from the data processing apparatus of the first embodiment in the structure of the memory control circuit 3. In FIG. 3, a clock change signal line 31 extends to the memory control circuit 3 from the clock control circuit 2, and a memory access signal line 32 connects to the clock control circuit 2.

The memory control circuit 3 includes a memory interface circuit 25 which is connected to a memory 5. The memory interface circuit 25 interfaces between the memory 5 and the memory control circuit 3. The memory control circuit 3 also includes a bus interface circuit 26 connected to a CPU bus 18. The bus interface circuit 26 interfaces between the CPU bus 18 and the memory control circuit 3. The memory control circuit 3 further includes an access wait time register (referred to as "first access wait time register") 27, another access wait time register (referred to as "second access wait time register") 28, selector 30, and access wait time change circuit 29. The first and second access wait time registers 27 and 28 are both connected to the bus interface circuit 26. A certain value is stored in each of the first and second access wait time registers 27 and 28 to determine an access wait time to the memory 5. The selector 30 selects one of the first and second access wait time registers 27 and 28 in accordance with a control signal provided from the access wait time change circuit 29. The access wait time change circuit 29 receives a signal from the clock change signal line 31 extending from the clock dividing circuit 6 of the clock control circuit 2. The clock change signal line 31 outputs a value to designate a clock dividing ratio, which is selected by the clock control circuit 2. For example, if the value on the clock change signal line 31 is "0", the clock dividing ratio is set to 1. If the value on the clock change signal line 31 is "1", the clock dividing ratio is set to 1/8.

The memory interface circuit 25 issues a signal (referred to as "memory access signal") indicating that the CPU 1 is now accessing the memory 5. The memory access signal is output onto the memory access signal line 32, and sent to a clock dividing ratio change circuit 33 of the clock control circuit 2. It is therefore possible to determine (detect) whether the memory is being accessed. When the memory access signal is asserted on the line 32, the clock dividing ratio change circuit 33 does not change the content of the clock dividing ratio register 7, even if an interrupt signal INT0, INT1, INT2 and/or INT3 is asserted. The clock dividing ratio change circuit 33 changes the value in the clock dividing ratio register 7 after the memory access signal line 32 is negated.

The content of the first access wait time register 27 and the content of the second access wait time register 28 can be rewritten by software of the CPU 1. For example, it should be assumed that the first register 27 stores a value "8" to match a high speed clock and the second register 28 stores a value "0" to match a low speed clock. The value "8" means that the access wait time is 8-clock worth (long). The value "8" is the wait time number. Therefore, not only the change of the CPU clock frequency, but also the change of the memory access timing are possible.

An operation of the data processing apparatus 10 of the second embodiment will be described. The following description primarily focuses on the difference between the first and second embodiments (i.e., memory access).

When the data processing apparatus 10 is in a low speed clock mode or stand-by mode, the CPU 1 selects a low speed clock by the software control. Specifically, the CPU 1 causes the clock dividing ratio register 7 to select "1/8" as the dividing ratio. Therefore, each circuit of the data processing apparatus 10 including the CPU 1 operates at the clock having a low frequency.

At this moment, the clock change signal line 31 outputs "1". Upon receiving "1", the access wait time change circuit 29 causes the selector 30 to select the second access wait time register 28. The second access wait time register 28 stores the access wait time corresponding to the low speed clock. The second access wait time register 28 stores the access wait time number "0". Accordingly, the access timing to the memory 5 is set to zero (no waiting time). This matches the low speed clock operation.

In the meantime, if the interrupt signal INT0 is asserted, the clock dividing ratio change circuit 33 refers to the memory access signal line 32. If the clock dividing ratio change circuit 33 determines that the memory access signal line 32 is asserted, then the clock dividing ratio change circuit 33 recognizes that the memory is being accessed. The clock dividing ratio change circuit 33 waits until the memory access signal line 32 is negated. After the memory access signal line 32 is negated, the clock dividing ratio change circuit 33 changes the value in the clock dividing ratio register 7 such that a new value suits for the high speed clock. Upon this change, the clock dividing circuit 6 divides the basic clock to a high(er) speed clock. The clock dividing circuit 6 also outputs "0" on the clock change signal line 31. Upon receiving "0", the access wait time change circuit 29 operates the selector 30 such that the selector 30 selects the first access wait time register 27. The first access wait time register 27 is a register suited for a high speed clock. The access wait number "8" is stored in the first access wait time register 27. Therefore, the shift to the high speed clock and the change of the memory access wait time suited for the high speed clock take place simultaneously while no access is being made to the memory 5. After that, the CPU 1 operates with the high speed clock.

In the second embodiment, the change of the clock frequency and the change of the memory access wait time are made by the hardware, not the software. Thus, these changes take place quickly. Since the data processing apparatus 10 can confirm that there is no memory access, it is possible to change the clock frequency and the memory access wait time at the same time during the no memory access period. In other words, wait time insertion required when there is discrepancy between the timing of the clock frequency change and the timing of the memory access wait time change is no longer necessary.

Figure 4:
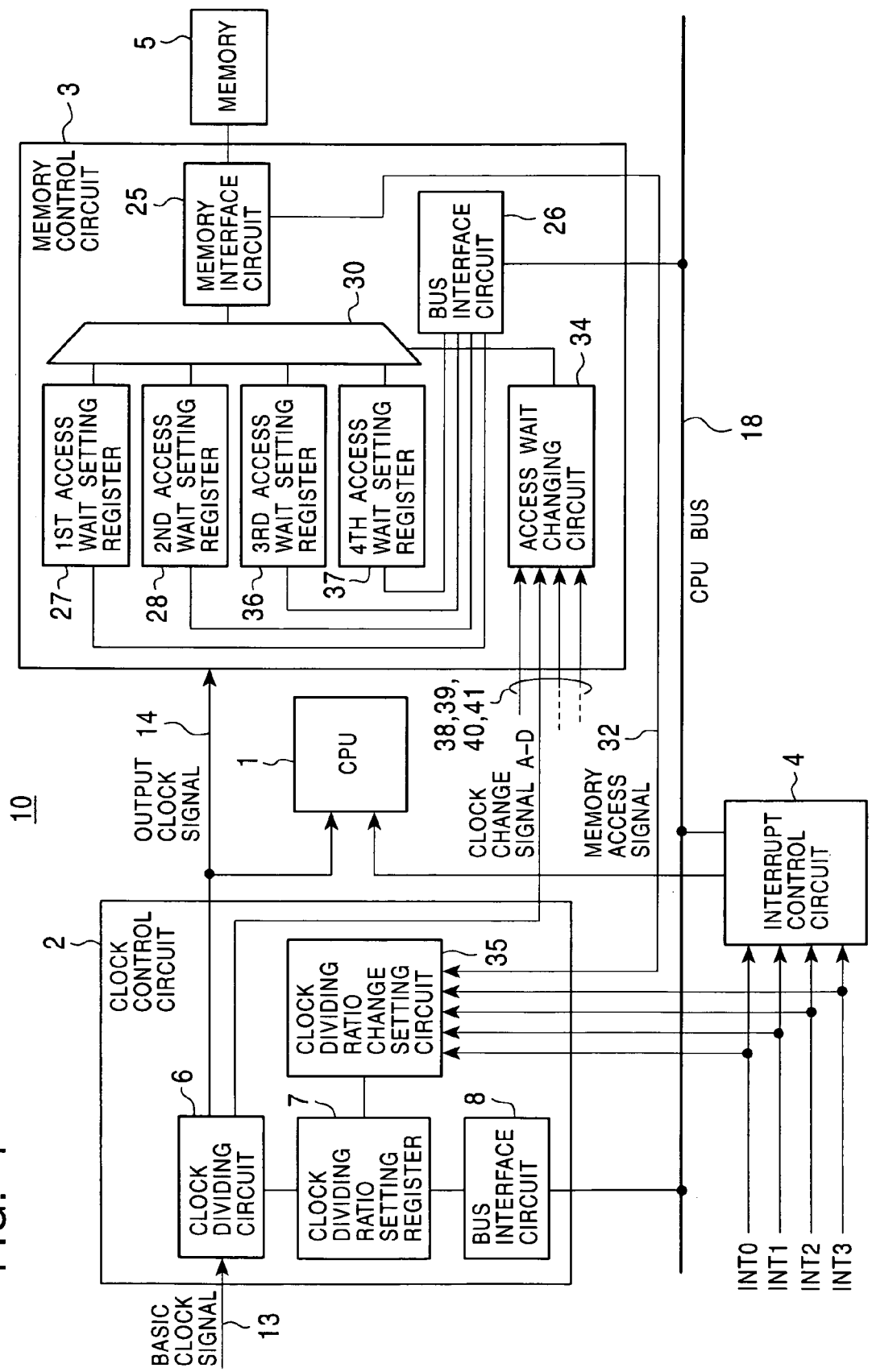
FIG. 4 illustrates a block diagram of a data processing apparatus according to a third embodiment of the present invention.

Third Embodiment:

Referring to FIG. 4, a third embodiment of the present invention will be described. Similar reference numerals are used to designate similar elements in the first, second and third embodiments. The third embodiment is different from the second embodiment in that the data processing apparatus can deal with a plurality of clock dividing ratio change requests. The data processing apparatus provides three or more memory access wait times in the third embodiment.

Like the first embodiment, a clock change circuit 35 receives four interrupt signals INT0 to INT3. The four interrupt signals INT0 to INT3 are also used as four clock dividing ratio change requests. The clock dividing circuit 6 has four clock change lines 38, 39, 40 and 41 corresponding to four clock frequencies, respectively. The four lines 38 to 41 connect to an access wait time change circuit 34 of the memory control circuit 3. One of the four lines 38 to 41 is asserted on the basis of a selected clock frequency.

The memory control circuit 3 includes first, second, third and fourth access wait time registers 27, 28, 36 and 37. An appropriate access wait time is set (i.e., appropriate access wait number is stored) in each of the first to fourth registers 27, 28, 36 and 37 to match each of the four clock change signal lines 38 to 41. The access wait time change circuit 34 determines which one of the four lines 38 to 41 is asserted. The access wait time change circuit 34 then operates the selector 30 to select one of the four registers 27, 28, 36 and 37 in accordance with the asserted line.

Figure 5:
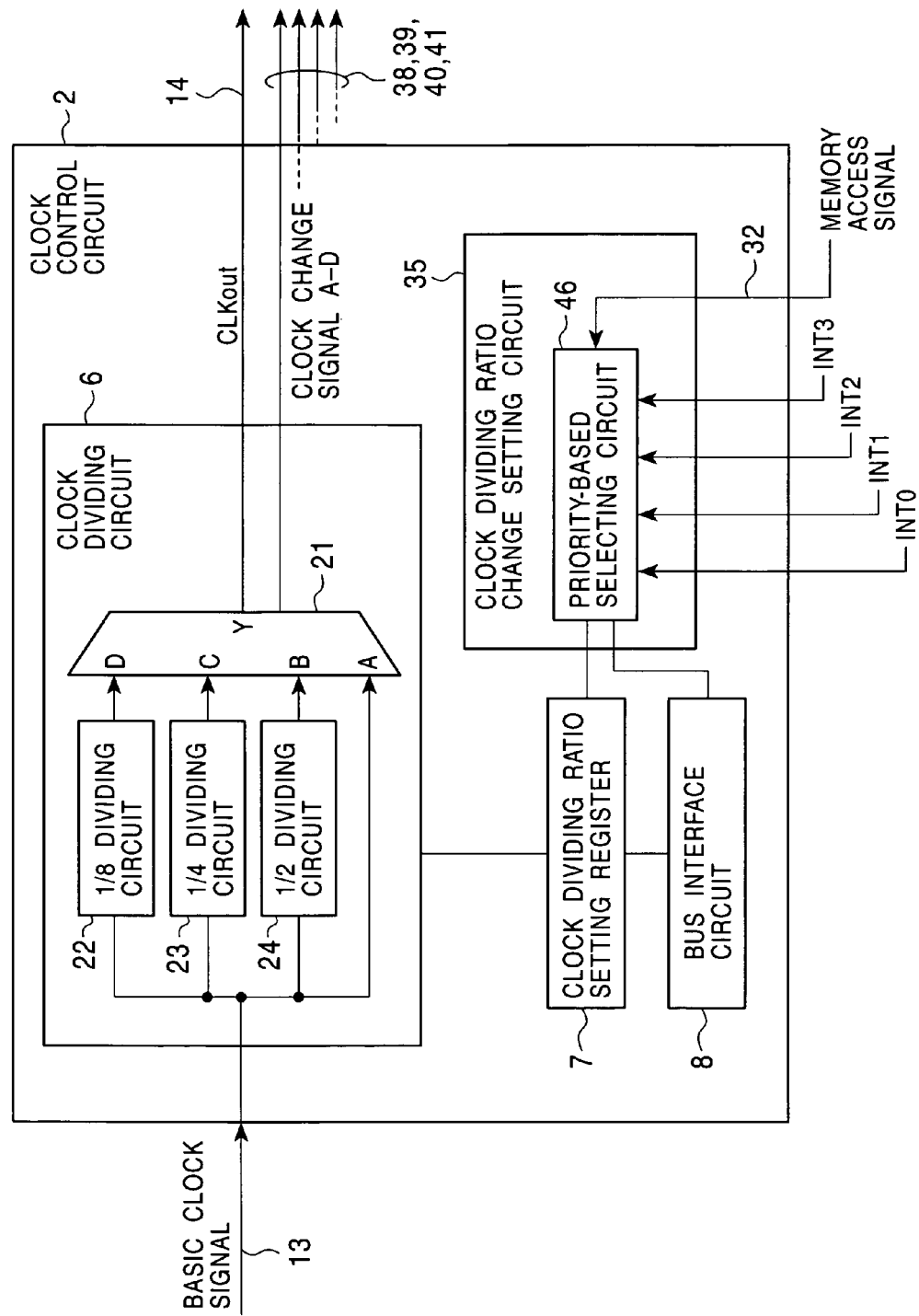
FIG. 5 illustrates a detailed block diagram of a clock control circuit included in the data processing apparatus shown in FIG. 4.

FIG. 5 illustrates a detailed structure of the clock control circuit 2.

The clock control circuit 2 of the third embodiment is different from the clock control circuit of the first embodiment in that the memory access signal line 32 connects to the priority-based selecting circuit 46 in the clock dividing ratio change circuit 35. When the memory access signal line 32 is asserted, the clock dividing ratio change circuit 35 does not change the value in the clock dividing ratio register 7 even if any interrupt signal INT0, INT1, INT2 or INT3 is asserted.

The selector 21 of the clock dividing circuit 6 of the third embodiment is different from that of the first embodiment in that the selector 21 has four inputs A, B, C and D, and four clock change signal lines 38, 39, 40 and 41 extend from the selector 21. The selector 21 selects one of the input terminals A to D, and asserts one of the four lines 38 to 41 in accordance with the selected input terminal.

Now, an operation of the data processing apparatus 10 of the third embodiment will be described.

When the data processing apparatus 10 is in a low speed clock mode or stand-by mode, the CPU 1 selects a low speed clock by the software control. Specifically, the CPU 1 writes a value "11b" into the clock dividing ratio register 7 via the bus interface circuit 8. As the value "11b" is written (overwritten) in the clock dividing ratio register 7, the clock dividing circuit 6 selects the 1/8 dividing circuit 22 because the dividing ratio "1/8" corresponds to the value "11b" of the clock dividing ratio register 7. As a result, the basic clock signal 13 is divided by eight in the clock dividing circuit 6. The output clock signal 14 is thus issued. Each circuit of the data processing apparatus 10 including the CPU 1 operates at the clock having the lowest frequency.

As the 1/8 dividing circuit 22 is selected, the selector 21 of the clock dividing circuit 6 asserts the clock change signal line 41. Then, the access wait time change circuit 34 causes the selector 30 to select the access wait time register 37, which corresponds to the clock change signal D (or the clock change signal line 41). Consequently, the memory access is carried out with the memory access wait time that suits for the slowest clock frequency.

It should be assumed that the interrupt signal INT1 is asserted while the data processing apparatus 10 is operating in the above described low speed clock mode. The interrupt signal INT1 is an interrupt signal that requires the second fastest processing. If another interrupt signal having a higher priority than the interrupt signal INT1 is not asserted, the priority-based selecting circuit 46 selects the interrupt signal INT1. The priority-based selecting circuit 46 then determines whether the memory access signal line 32 is asserted or negated.

When the memory access signal line 32 is negated, the selecting circuit 46 sends a signal corresponding to the interrupt signal INT1, to the clock dividing ratio register 7, so that the content of the clock dividing ratio register 7 is changed to a value "01b". "01b" is a value corresponds to the interrupt signal INT1.

When the memory access signal line 32 is asserted, the selecting circuit 46 waits until the memory access signal line 32 is negated, in order not to change the clock speed (frequency) during the memory access. The selecting circuit 46 does not change the content of the clock dividing ratio register 7 until the memory access signal line 32 is negated. After the memory access signal line 32 is negated, the selecting circuit 46 changes the content of the clock dividing ratio register 7 so that the value "01b" corresponding to the interrupt signal INT1 is written in the clock dividing ratio register 7.

The selector 21 in the clock dividing circuit 6 selects the 1/2 dividing circuit which corresponds to the value "01b" of the clock dividing ratio register 7. At the same time, the selector 21 asserts the clock change signal line 39. The access wait time change circuit 34 of the memory control circuit 3 operates the selector 30 to select the access wait time register 28 which corresponds to the clock change signal line 39 (or the clock change signal B).

As understood from the above, while the memory access is not being performed, the output clock signal 14 is changed from the 1/8 divided clock signal (i.e., slowest clock) to the 1/2 divided clock signal, and the memory access wait time is changed to match the 1/2 divided clock. The CPU 1 then operates with the adjusted clock frequency and the adjusted memory access wait time. The interrupt signal INT1 is accepted by the interrupt circuit 4 so that an interrupt routine corresponding to the interrupt signal INT1 is started.

In the third embodiment, the data processing apparatus 10 has a plurality of input terminals to receive a plurality of clock frequency change requests, so that it is possible to change the clock frequency to a plurality of values. In short, it is possible to determine the clock frequency that best suits for a current operating condition of the data processing apparatus 10. Further, the data processing apparatus 10 can change the memory access wait time to a plurality of values, in accordance with the selected clock frequency, without delay. This optimizes the relationship between the software processing time and the electric power consumption in the data processing apparatus 10. Moreover, since the priority-based selecting circuit is provided for a plurality of hardware interrupt signals, the data processing apparatus 10 can perform a possible highest speed processing when a plurality of clock frequency change requests are made simultaneously.

Figure 6:
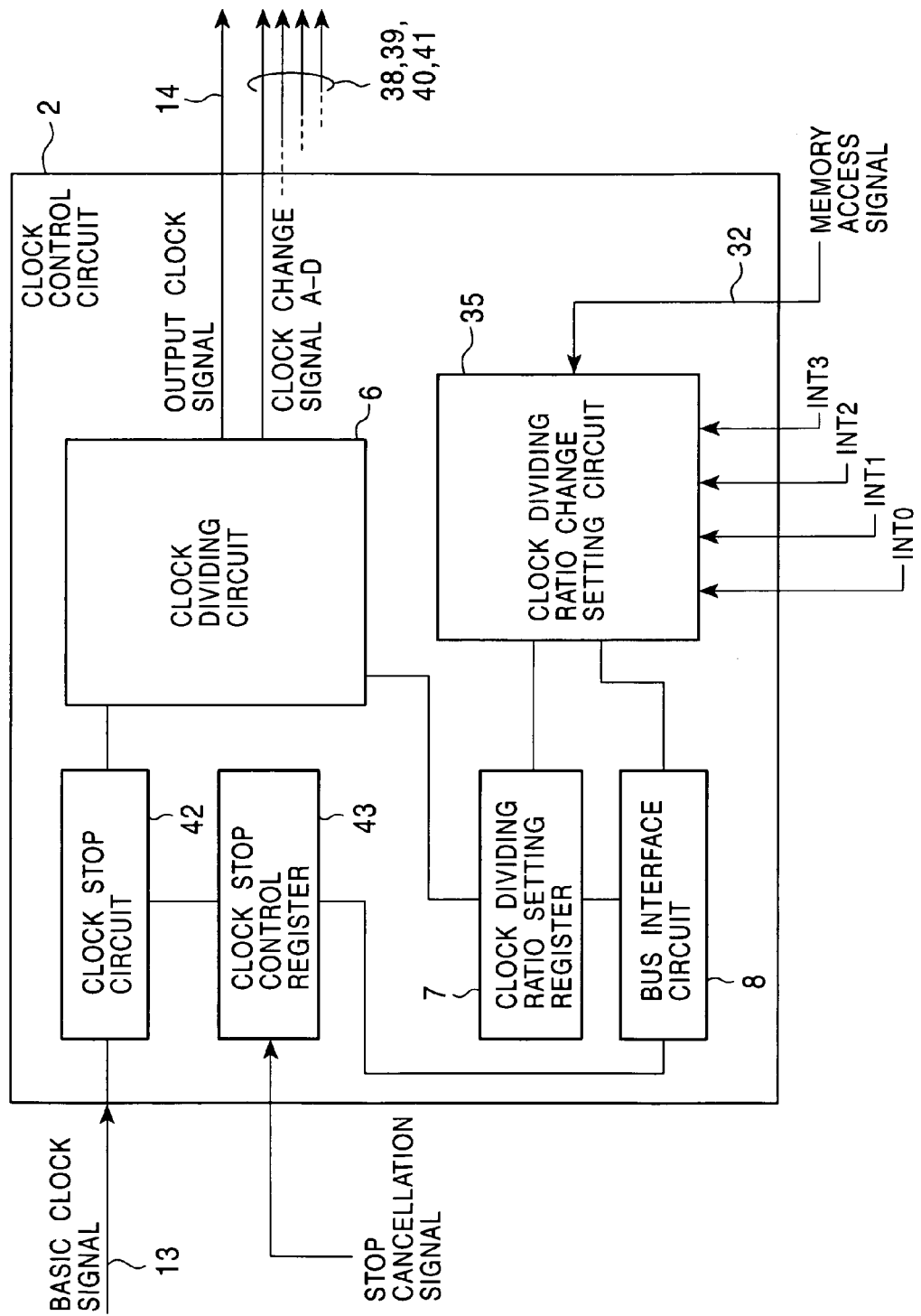
FIG. 6 illustrates a detailed block diagram of a clock control circuit included in a data processing apparatus according to a fourth embodiment of the present invention.

Fourth Embodiment:

Referring to FIG. 6, a fourth embodiment of the present invention will be described. FIG. 6 particularly illustrates a detailed structure of a clock control circuit 2. Similar reference numerals are used to designate similar elements in the first to fourth embodiments.

As compared with the clock control circuit 2 of the third embodiment (FIG. 5), the clock control circuit 2 of the fourth embodiment additionally includes a clock stop circuit 42 and a clock stop control register 43. The clock stop circuit 42 is connected to the clock stop control register 43. The clock stop circuit 42 is also connected to the clock dividing circuit 6. The clock stop control register 43 is connected to the bus interface circuit 8. The clock stop circuit 42 operates in accordance with the setting of the clock stop control register 43. Specifically, the clock stop circuit 42 stops or allows passage of the basic clock signal 13 to the clock dividing circuit 6, based on the setting of the clock stop control register 43. The setting for the clock stop is made to the register 43, for example, by a stop command provided from the CPU 1 via the bus interface circuit 8. The setting for the clock passage is made to the register 43 by a stop cancellation (release) command (Wake Up signal) from the interrupt control circuit 4. For example, the stop cancellation command is produced by the interrupt control circuit 4 when either the interrupt signal INT0 or the interrupt signal INT1 is entered to the interrupt control circuit 4. This maybe enabled by using an OR gate for the two interrupt signals INT0 and INT1.

An operation of the data processing apparatus of the fourth embodiment will now be described.

When there is nothing for the CPU 1 to process, the CPU 1 software-controls the clock stop control register 43 to stop passage of the clock to the clock dividing circuit 6. It should be then assumed that a user of the data processing apparatus 10 operates a keyboard connected to the data processing apparatus to generate the interrupt signal INT0. The interrupt control circuit 4 has the OR gate to accept one of the interrupt signal INT0 and INT1 as a trigger to issue the stop cancellation signal. Accordingly, the interrupt control circuit 4 asserts the stop cancellation signal. Upon receiving the stop cancellation signal, the clock stop control register 43 sets a value to resume the passage of the clock signal to the clock dividing circuit 6. As such a value is set in the register 43, the clock stop circuit 42 cancels the stoppage of the clock signal so that the clock signal is introduced to the clock dividing circuit 6. Since the interrupt signal INT0 is input to the data processing apparatus 10, both the clock dividing ratio and the memory access wait time are adjusted to suit for the interrupt signal INT0 in the same manner as the foregoing embodiments. Adjustment of the clock dividing ratio and the memory access wait time is performed by hardware at high speed.

In the fourth embodiment, when the clock stop condition is returned to the clock passage condition (i.e., normal condition), the clock frequency and the memory access wait time are adjusted in accordance with one of a plurality of interrupt signals, which is determined by the user of the data processing apparatus 10, at high speed without causing any troubles such as a memory error. The clock frequency after returning to the clock passage condition is a value suited for an interrupt signal entered most recently. A previously entered interrupt signal does not determine the clock frequency.

It should be noted that the present invention is not limited to the above described embodiments. For example, the interrupt signals may be independent from the clock change request signals. The clock change request signals may be entered from an external device or by software control. The clock frequency adjustment and/or the memory access wait time adjustment may be performed independently of the interrupt signals. The adjustment of the memory access wait time is equivalent to the adjustment of the memory access timing. The memory access wait time may be determined in terms of mili-second.

What is claimed is:

1. A data processing apparatus comprising:
    a CPU configured to operate with one of a plurality of clock frequencies determined in accordance with a selected one of a plurality of clock change signals, a priority order being given to the plurality of clock change signals and the plurality of clock change signals being derived from a plurality of interrupt signals supplied to the CPU;
    a selector for selecting one of the plurality of clock change signals based on the priority order; and
    a clock frequency changer for conveying a clock signal having said one of the plurality of clock frequencies to the CPU based on the selected one of the plurality of clock change signals.

2. The data processing apparatus according to claim 1 further comprising:
    a storage unit for storing plural pieces of CPU operating condition setting information corresponding to the plurality of clock change signals, the plural pieces of CPU operating condition setting information including a plurality of memory access timings corresponding to the plurality of clock change signals; and
    a detector for determining whether a memory access is currently being performed,
    wherein the clock frequency changer is inoperative when the detector determines that a memory access is currently being performed, and
    wherein the clock frequency changer conveys the clock signal having said one of the plurality of clock frequencies together with CPU operating condition setting information having one of the plurality of memory access timings based on the selected one of the plurality of clock change signals when the detector determines that a memory access is not currently being performed.

3. The data processing apparatus according to claim 2, wherein the plurality of clock change signals correspond to the plurality of interrupt signals supplied to the CPU.

4. The data processing apparatus according to claim 1, wherein the priority order is decided in accordance with the clock frequencies.

5. The data processing apparatus according to claim 1 further comprising a clock stop unit for preventing passage of the clock signal to the CPU, and a stop cancellation unit for resuming the passage of the clock signal to the CPU in response to at least one of the plurality of clock change signals.

6. A data processing apparatus comprising:
    a CPU configured to operate with one of a plurality of clock frequencies determined in accordance with a selected one of a plurality of clock change signals, a priority order being given to the plurality of clock change signals and the plurality of clock change sianals being derived from a plurality of interrupt signals supplied to the CPU;
    selecting means for selecting one of the plurality of clock change signals based on the priority order; and
    clock frequency changing means for conveying a clock signal having said one of the plurality of clock frequencies to the CPU based on the selected one of the plurality of clock change signals.

7. The data processing apparatus according to claim 6 further comprising:

storage means for storing plural pieces of CPU operating condition setting information corresponding to the plurality of clock change signals, the plural pieces of CPU operating condition setting information including a plurality of memory access timings corresponding to the plurality of clock change signals; and detecting means for determining whether a memory access is currently being performed, wherein the clock frequency changing means is inoperative when the detecting means determines that a memory access is currently being performed, and wherein the clock frequency changing means conveys the clock signal having said of the plurality of clock frequencies together with CPU operating condition setting information having one of the plurality of memory access timings based on the selected one of the plurality of clock change signals when the detecting means determines that a memory access is not currently being performed.

8. The data processing apparatus according to claim 7, wherein the plurality of clock change signals correspond to the plurality of interrupt signals supplied to the CPU.

9. The data processing apparatus according to claim 6, wherein the priority order is decided in accordance with the clock frequencies.

10. The data processing apparatus according to claim 6 further comprising a clock stop means for preventing passage of the clock signal to the CPU, and a cancellation means for resuming the passage of the clock signal to the CPU in response to at least one of the plurality of clock change signals.

* * * * *